US006843526B2

United States Patent
Honda et al.

(10) Patent No.: US 6,843,526 B2
(45) Date of Patent: Jan. 18, 2005

(54) REMOVABLE JUMP SEAT FOR A VEHICLE (76) Inventors: Hiroyuki Honda, 4516 Tuttle's Creek Dr., Dublin, OH (US) 43016; Charles Stephen Haase, 119 Bridgeport Way, Delaware, OH (US) 43015; Kelly Michael Whalen, 308 E. Clearview Ave., Worthington, OH (US) 43085; Takuya Hori, 2-30-2 Fuchinobe, Sagamihara-shi, Kanagawa (JP); Tatsuya Sugimoto, 303 Ryoken, 3-11-20 Yoto Utsunomiya City, Tochigi (JP)

( * ) Notice: Subject to any disclaimer, the term of this patent is extended or adjusted under 35 U.S.C. 154(b) by 122 days.

(21) Appl. No.: 10/106,294

(22) Filed: Mar. 26, 2002

(65) Prior Publication Data

US 2003/0184129 A1 Oct. 2, 2003

(51) Int. Cl.[7] .............................. A47C 9/06; B60N 2/04; B60N 2/12
(52) U.S. Cl. .................. 297/14; 297/344.1; 297/378.13; 296/65.03; 296/65.11; 296/65.12
(58) Field of Search .............................. 297/14, 378.12, 297/378.13, 344.1; 296/65.11, 65.13, 65.12, 65.03

(56) References Cited

U.S. PATENT DOCUMENTS

| 4,740,030 A | 4/1988 | Nordskog | 297/13 |
| 4,955,575 A | 9/1990 | Moore | 248/398 |
| 5,195,795 A | 3/1993 | Cannera et al. | 296/65.1 |
| 5,489,141 A | 2/1996 | Strausbaugh et al. | 297/335 |
| 5,707,103 A | 1/1998 | Balk | 297/13 |
| 5,984,397 A | 11/1999 | Dawson et al. | 296/65.09 |
| 6,343,834 B1 | 2/2002 | Wurmlinger | 297/14 |
| 6,460,922 B1 * | 10/2002 | Demick | 297/14 |
| 6,460,929 B2 * | 10/2002 | Kamida | 297/14 X |

FOREIGN PATENT DOCUMENTS

| JP | 60143143 | * 7/1985 | 297/14 |
| JP | 6181829 | * 4/1986 | 297/14 |

* cited by examiner

*Primary Examiner*—Anthony D. Barfield
(74) *Attorney, Agent, or Firm*—Eley Law Firm Co.; James R. Eley; Michael A. Forhan (57) ABSTRACT

A storable and removable jump seat for use in a vehicle. The improved seat provide for convertible seating in the form of a folding jump seat provides conforming appearance, comfort, safety and practicality. The jump seat provides a safe, comfortable and easily storable seat that may be folded and stored against a wall within the vehicle's cargo area in order to expand the available cargo space. The jump seat assembly is also designed to be quickly and easily removable in order to increase the available cargo space within a vehicle. The jump seat may be quickly and easily reinstalled without the need for tools or additional assistance. Multiple jump seats may be arranged within a vehicle to provide a side by side seating arrangement.

9 Claims, 5 Drawing Sheets

REMOVABLE JUMP SEAT FOR A VEHICLE

FIELD

The inventive embodiments are directed towards vehicular seating. More particularly, the inventive embodiments relate to a storable and easily removable jump seat for use in vehicles such as vans and sports utility vehicles.

BACKGROUND

Vans and sport utility vehicles ("SUVs") have become a popular means of transportation partly because of their flexibility and multi-faceted utility. For example, a van may on one occasion be utilized to transport a number of passengers and on another occasion be used to transport a variety of cargo, or even a combination of both. Because of the demands on the versatility of such vehicles, it has become a fairly common practice to design a vehicle's rear seats so they can be converted, folded, stored or removed in order to extend the amount of cargo space available. Some seating arrangements are more accommodating than others. Some are designed to engage the floor until released, enabling them to be removed from the vehicle for storage. Other designs provide rollers to assist the user in removing the seating arrangement from the vehicle. Thus, given enough notice, a user needing to extend the available cargo space in a vehicle may remove seating in advance of picking up and loading the cargo.

However, in a fast-paced and hyperactive society, it is not always possible to plan far enough ahead of time to remove a vehicle's seating to convert the space for cargo. In some situations a driver may have to turn down opportunities to pick up and transport cargo because the need arose while the driver was away from home, that is, somewhere where it was impractical to remove the rear seating and securely store it. The designers of automobiles have partially accommodated this dilemma by making the seats in some vans and SUVs foldable toward the front of the cargo space, storable in the floor body or foldable against the wall of the vehicle. However, those designs that provide for a convertible seating in the form of a folding jump seat generally face problems concerning appearance, comfort, safety and practicality. Some of the seating that is storable within the vehicle remains coupled to the floor during storage, thereby obstructing a portion of the floor space. Therefore, it is desirable to have a safe, comfortable and easily storable seat that may be folded and stored within the cargo area of a vehicle to expand the cargo space and maximize floor space while also being quickly and easily removable in order to maximize the total available cargo space. Likewise it is desirable to have that same seating arrangement be quickly and easily reinstalled by the consumer without the need for tools or additional assistance.

SUMMARY

According to one aspect, a manifestation of the inventive embodiments provides a seat for selective engagement with the floor of a vehicle and releasable storage against an inside wall of a vehicle. The seat includes a seat base with a foot coupled to the bottom of the seat base for supporting a portion of the seat base upon the floor and having an engaging means for releasably engaging the floor. A seat striker assembly is mounted to an inside wall of the vehicle on the side of the seat substantially opposite the foot and is fitted with at least one seat striker member. The seat includes a hinge lock assembly for hingedly supporting the seat base against the wall and provided with at least one hinge lock for releasably engaging the seat striker member to secure said hinge lock assembly to said vehicle wall when engaged. The hinge lock assembly also provides the pivoting axis when the seat is being raised and lowered from its storage position against the wall. Located in an area preferably under the seat base, is an actuable floor lock release means for disengaging the foot from the vehicle floor when the release means is actuated. Upon actuation, the seat may be then rotated toward and stored substantially against the vehicle wall until returned to its operating position.

According to a further aspect, an inventive embodiment provides for a manually removable seat for selective engagement with the floor of a vehicle and releasable storage against an inside wall of a vehicle. In this embodiment, the seat has a seat base having an internal frame. Mounted to the floor is a floor striker assembly fitted with at least one striker. The seat includes a foot hingedly coupled to the seat frame for supporting a portion of the seat base upon the floor. The foot may also be provided with at least one lock for releasably engaging the at least one striker member for securing the foot to the floor body when the seat is installed. The foot is preferably foldable within the seat base when the seat is in its stored position. On the other side of the seat base, a seat striker assembly is mounted to an inside wall of the vehicle and is fitted with at least one seat striker member. A hinge lock assembly having at least one hinged extension is coupled to the seat frame and is configured to support one side of said seat base against the wall and to provide the pivoting axis for storing the seat. The hinge lock assembly is provided with at least one hinge lock for releasably engaging the seat striker member for securing one side of the seat base when the hinge lock assembly is engaged. An actuable floor lock release means is coupled to the foot for disengaging the lock from the floor striker member when the release means is actuated, allowing the seat to be rotated toward and stored substantially against the vehicle wall.

Yet another aspect of the inventive embodiments provides for a manually removable seat in a vehicle wherein the seat is removably disengaged from the vehicle floor and vehicle wall upon actuation of both a floor lock release means and a hinge lock release means.

Another aspect of the inventive embodiments provides for a seat, having a seat base, for selective engagement with the floor of a vehicle and being pivotable into a storage position substantially against an inside wall of the vehicle, wherein the seat is completely disengaged from the floor when in the storage position and the seat is pivotable about an axis located substantially parallel to the floor and spaced above the floor at least as high as a top surface of the seat base.

Yet another aspect of the inventive embodiments provides for a manually removable seat for selective engagement with the floor of a vehicle and being pivotable into a storage position substantially against an inside wall of the vehicle, wherein the seat is completely disengaged from the floor when in the storage position and is pivotable about an axis substantially parallel to both the floor and the wall.

Yet another aspect of the inventive embodiments provides for a manually removable seat in a vehicle that is easily and quickly stored against an inside wall of a vehicle, easily and quickly reinstalled onto the floor of the vehicle or easily and quickly removed from the vehicle completely depending upon the amount of cargo space desired.

Still another aspect of the inventive embodiments provides for a storable jump seat that maximizes the amount of floor for cargo.

It is to be understood that both the foregoing general description and the following detailed description are exemplary only and are not restrictive of the inventive embodiments, as claimed.

BRIEF DESCRIPTION OF THE DRAWINGS

The accompanying drawings, which are included to provide a further understanding of the inventive embodiments and incorporated in and constitute a part of this specification, illustrate aspects of the inventive embodiments and, together with the description, provide an explanation of the inventive embodiments disclosed and claimed herein. In the drawings:

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like components.

Figure 1A:
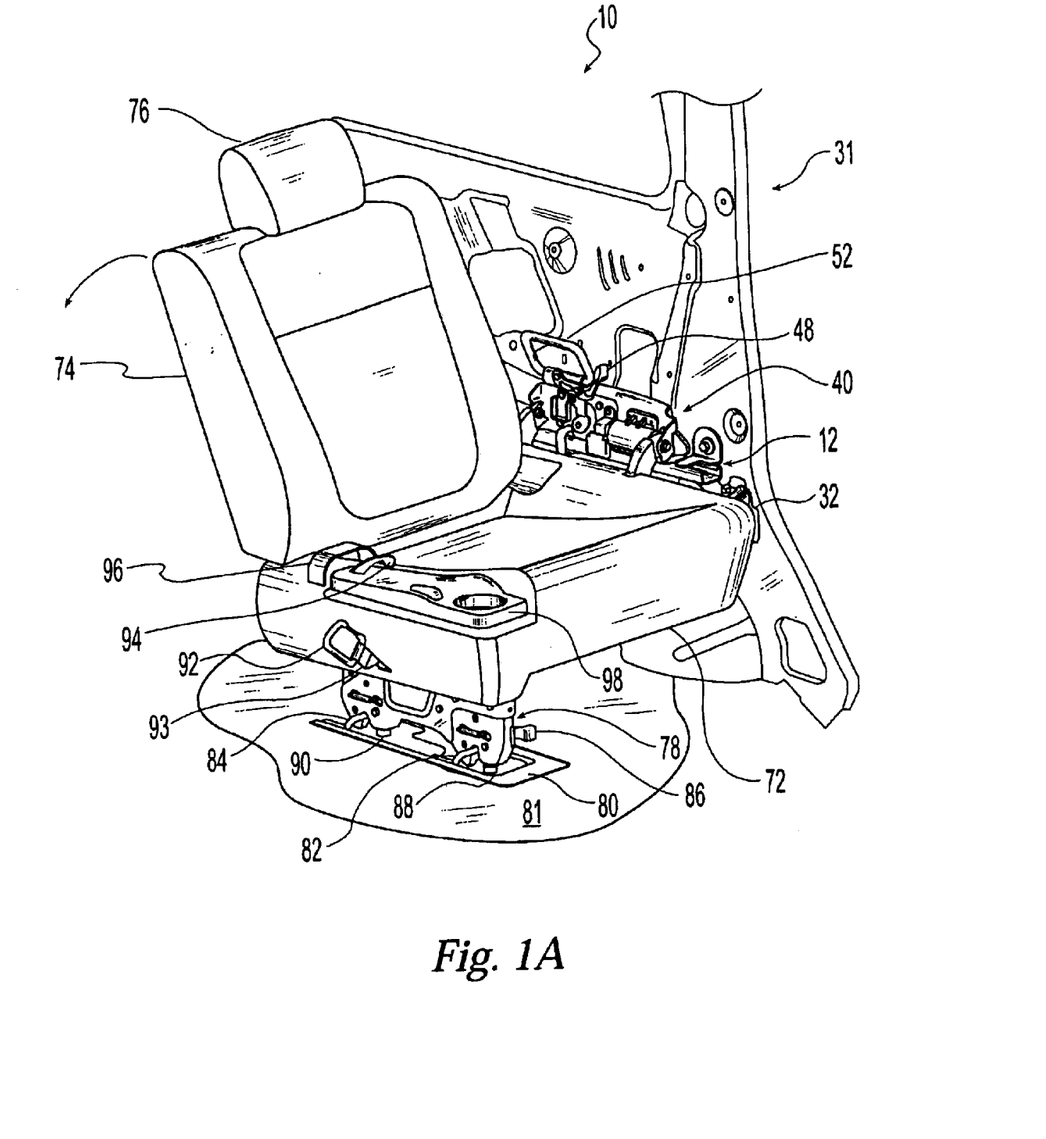
FIG. 1A is a perspective view of a removable seat for a vehicle according to one embodiment of the invention.
Figure 1B:
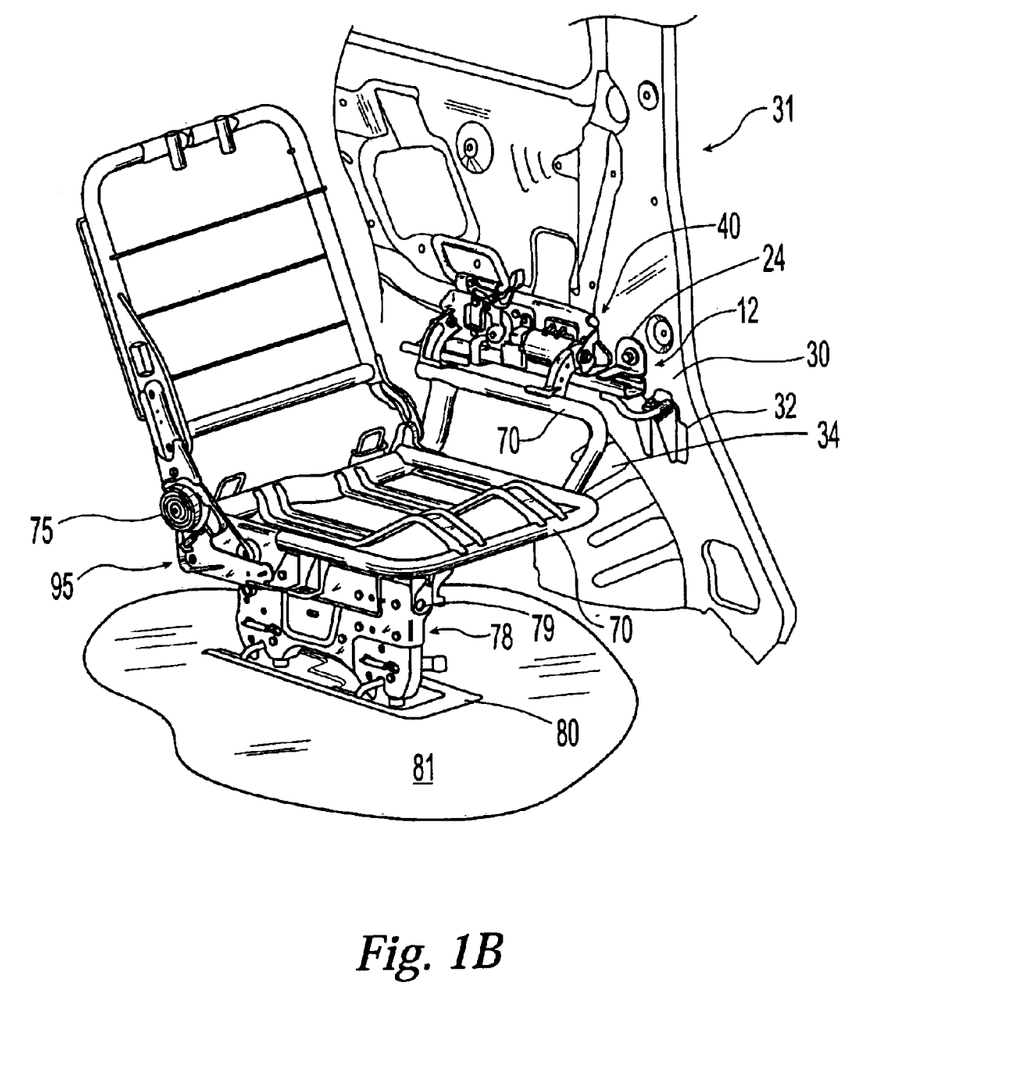
FIG. 1B is a perspective view of the frame of a removable seat installed in a vehicle.
Figure 5:
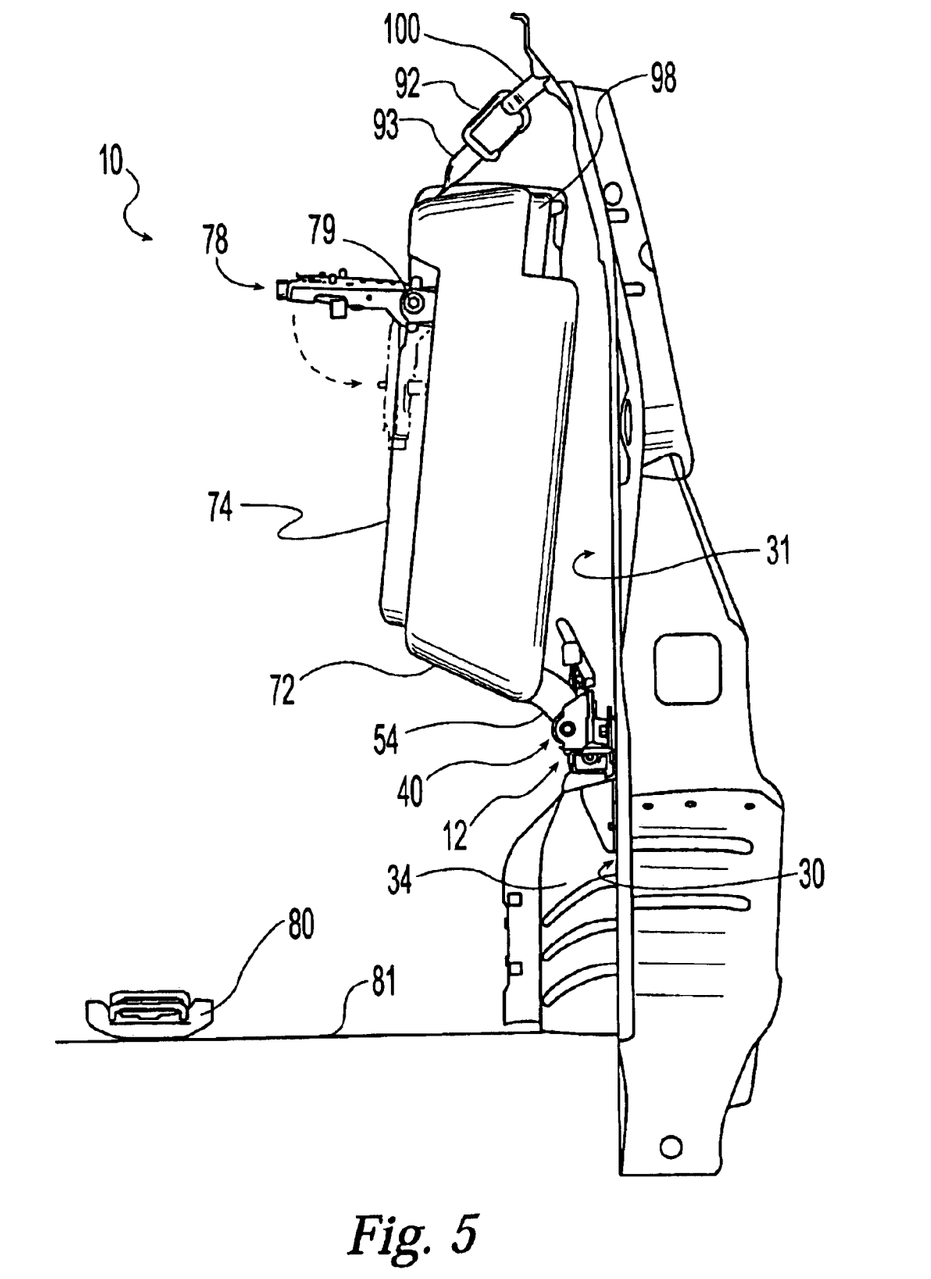
FIG. 5 is a side elevation view of a removable seat in its stored position substantially against the inside wall of a vehicle.

With reference to FIGS. 1A and 1B, a removable seat, which may also be referred to as a jump seat, as embodied herein, is designated by the numeral 10. For the purpose of clarity and to expose the structure of seat frame 70, FIG. 1B depicts seat 10 in substantially the same view but without cushions in the seat base 72 and seat back 74 areas. The seat 10 in substantially the same view but is shown having a substantially rectangular seat base 72 upon which a passenger may be seated. The seat base 72 preferably comprises a cushioned surface supported by seat frame 70 and may be covered in any number of different materials, such as natural or synthetic fabrics, leather or plastic, depending upon the taste of the consumer and the intended use of the vehicle. Pivotably coupled to the rear of the seat base 72 is seat back 74 which is preferably of a similar construction as the seat base. Seat back 74 is designed to pivot backwards at its junction with the seat base 72 in stages towards a substantially reclined position for passenger comfort or in preparation of folding the seat 10 into its storage position, as shown in FIG. 5. The pivoting of the seat back 74 into a reclined position may be accomplished by the actuation of seat back release pull 94, which may be constructed of a webbed fabric loop, rope or other release mechanisms known in the art. Seat back release pull 94 may be coupled to seat back release mechanism 95, which, when actuated, provides for adjustment of the vertical angle of the seat back 74. A seat back return mechanism 75, such as a coiled spring or the equivalent, may be provided to bias the seat back 74 in a forward direction to assist a passenger in returning the seat back to its full upright position. For the comfort and safety of a passenger, seat back 74 may also be fitted with a head rest 76, which may adjusted to suit the physiology of a passenger.

A center console 98 may be provided on upper surface of the seat base 72 near one side as a convenience for the passenger and may be optimized to hold cups, coins or other items typically used by passengers. The center console 98 may also be located on the upper surface of seat base 72 toward the side nearest the center of the vehicle which has the additional benefit of discouraging passengers from sitting on this portion of the seat base. A foot 78 is coupled to seat base 72 at one side of seat 10 and provides spaced support for the seat base upon the body floor 81 as well as locking means and releasing means for releasably engaging the floor. "Releasable," "Releasably," "Detachable" and "Detachably" are used interchangeably herein with regard to engagement to connote complete disengagement between two members. The foot 78 is preferably pivotably coupled to seat base 72 at pivot point 79 to allow for the foot to be folded inwardly toward the seat base upon rotation of the seat 10 into its stored position. Foot 78 may be provided with front and rear foot locks (not shown in detail) as known in the art, for locking engagement with one or more strikers, such as front and rear floor striker members 82 and 84, which are fixedly coupled to body floor striker assembly 80, which in turn, is fixedly coupled to body floor 81. In this manner, foot 78 is removably anchored to the body floor 81 and provides for secure mounting of one side of seat 10 when installed. Captive front and rear floor striker members 82, 84 may be released from their respective locking members via actuation of lock release pull 86, which is preferably of a similar construction as seat back release pull 94. Upon release of the foot 78 from the body floor striker assembly 80, seat 10 is free to be either pivoted into a stored position or removed completely from the vehicle upon the additional disengagement of hinge lock assembly 40 from seat striker assembly 12. Details of this operation will be discussed below in conjunction with FIGS. 2–4. Front and rear damper feet 88 and 90 may be provided on the bottom surface of foot 78 for contact with the facing surface of body floor striker assembly 80 to add stability to seat 10 when installed, reduce strain on the front and rear floor striker locks, as well as to provide a resilient surface upon which to rest the jump seat when it has been removed from the vehicle. The exposed (outer) surface of foot 78 may be covered with a fitted, decorative fascia, or garnish (not shown) for appearance and safety sake. The fascia serves no other operational purpose and has been omitted from the figures in order to show other details of the foot. It will also be understood by one of ordinary skill in the art that this embodiment is merely an example. Instead of using two lock and striker combinations, as at 82 and 84, any other number of lock and striker combinations may be used provided they are effective to secure the seat 10 to the body floor 81. In addition, other types of removable securing means, such as screws or bolts, could be used instead of a lock and striker mechanism. The person of ordinary skill in the art is able to select an attachment structure having sufficient strength to secure the seat 10 to the vehicle, while still enabling a user to easily release the securing mechanism, for removing or stowing the seat preferably without the need for separate tools. In addition, while the foot 78 is shown as being placed adjacent one side of the seat base 72, it will be understood that the foot may be positioned at other locations on the seat base, such as along the front, back, or middle of the seat, or diagonally, provided the seat exhibits sufficient strength to adequately and safely support a seated passenger.

With continuing reference to FIG. 1B, seat striker assembly 12 is shown mounted to the vehicle wall 31 in the area above wheel well 34. However, it should be appreciated that this particular mounting scheme may vary as the seat 10 is adapted to other environs or structures without detracting from the invention. A support bracket 32 affixed to the vehicle wall 31 in the area proximate the door jamb 30 may be provided to secure seat striker assembly 12 to the body of the vehicle. Additional mounting brackets, such as at 24, may be incorporated into seat striker assembly 12 and coupled to the vehicle wall 31 with bolts, as at 28, to provide additional structural support for the seat striker assembly. Hinge lock assembly 40 is shown generally in this view being engaged with seat striker assembly 12. Additional details of these assemblies will likewise be discussed in conjunction with FIGS. 2–4. The exposed (outer) surfaces of seat striker assembly 12 and hinge lock assembly 40 may be covered with a fitted, decorative fascia, or garnish (not shown) for appearance and safety sake. The fascia serves no other significant operational purpose and has been omitted from the figures in order to show other details of the two assemblies.

Figure 2:
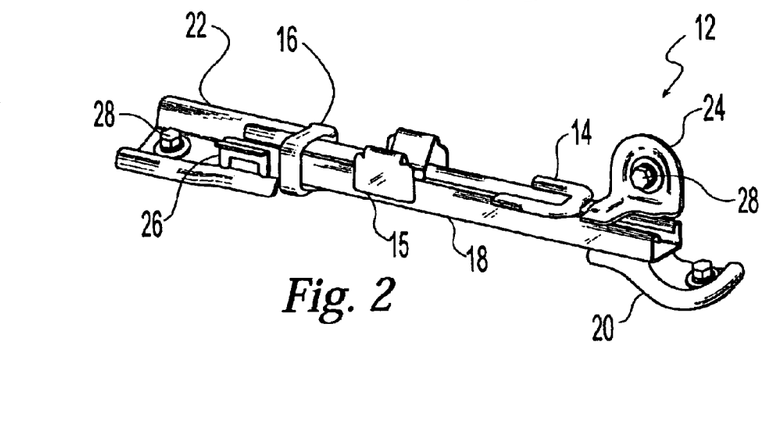
FIG. 2 is a perspective view of a seat striker assembly according to one embodiment of the invention.
Figure 3:
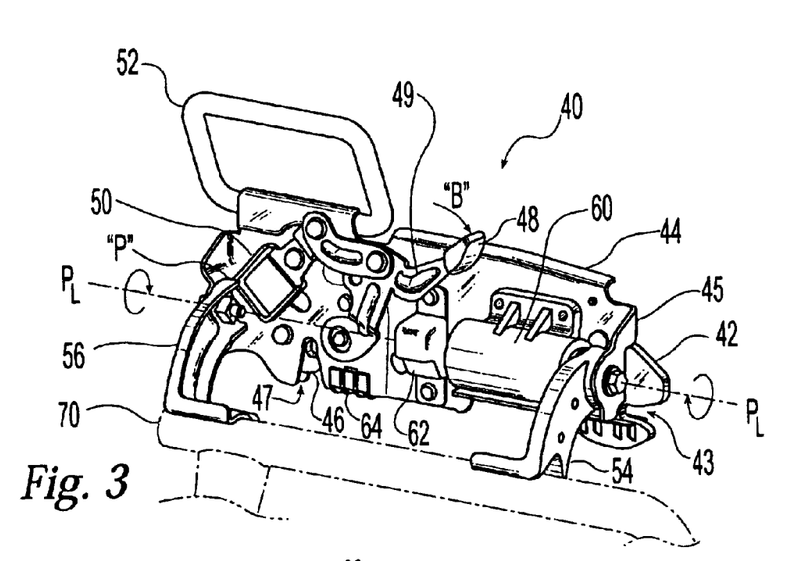
FIG. 3 is a perspective view of a hinge lock assembly according to one embodiment of the invention.
Figure 4:
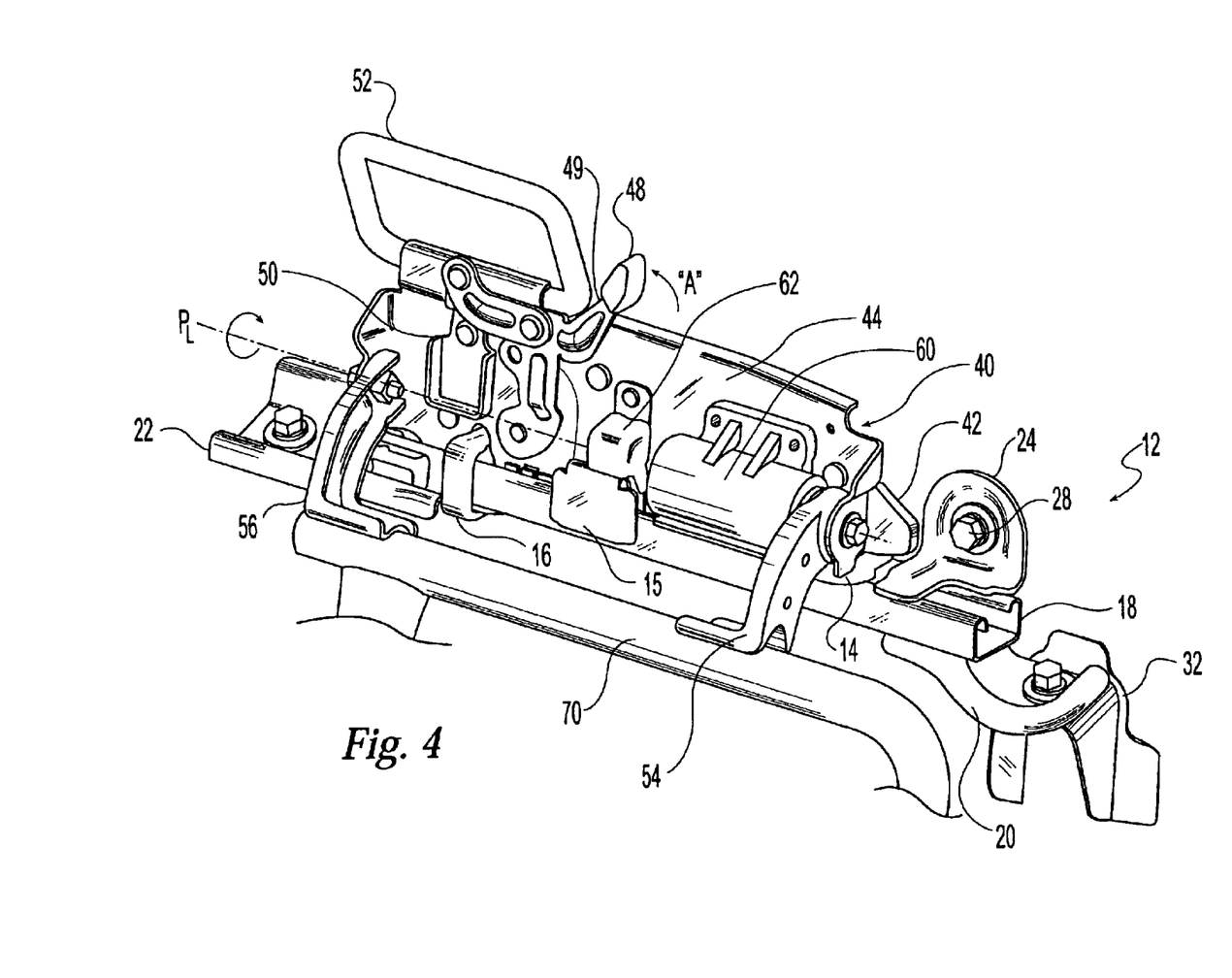
FIG. 4 is a perspective view of the hinge lock assembly engaged with the seat striker assembly according to one embodiment of the invention.

Referring now to FIGS. 2–4, hinge lock assembly 40 and seat striker assembly 12 are shown in detail. FIGS. 2 and 3 show the two assemblies 12, 40 disengaged, whereas FIG. 4 depicts them in their fully engaged and locked configuration. Looking to FIG. 2, seat striker assembly 12 is shown to comprise a structural channel 18 to which anchoring extensions, such as at 20, 22 and 24, may be affixed to provide a means for mounting the seat striker assembly to the vehicle wall 31 or equivalent structure. In the embodiment shown, the seat striker assembly 12 is mounted to a support bracket 32, the face of door jamb 30 and the upper surface of wheel well 34 via bolts, as at 28, or other, preferably removable, mounting means as known in the art. Front and rear seat strikers 14 and 16 are affixed to structural channel 18, typically by welding or other rigid securing means. Lateral stabilizer bracket 15 is also affixed to the structural channel and is located intermediate the front and rear seat strikers 14, 16. Lateral stabilizer bracket 15 may be configured in a "vee" shape corresponding to its mating complement, stabilizer bumper 62, mounted to the hinge lock assembly body 44 of hinged lock assembly 40, although other shapes would function equivalently to provide lateral stability between the seat striker assembly 12 and hinge lock assembly. Lastly, stopper brackets, as at 26, having a flat surface corresponding with the top surface of structural channel 18, may be strategically affixed to the side of structural channel to provide additional surface area for the hinge arm mounting brackets, as at 45, to rest upon. In this regard, the stopper bracket 26 lessens the amount of stress on structural channel 18 while the hinge lock assembly 40 is engaged with seat striker assembly 12 and the seat 10 is rotated about pivot line $P_L$. A locking cap 64 is provided at the bottom of the hinge lock assembly body 44 to prevent the separation of components of hinge lock assembly body as the seat 10 is rotated about pivot line $P_L$.

Referring next to FIG. 3, details of the hinge lock assembly 40 can be seen. Hinge lock assembly body 44 is shown to be configured with two seat striker engaging areas, the hook mouth 43 of front hook 42 and the hinge lock mouth 47 of rear lock 46. Pivotably coupled to front and rear hinge arm mounting brackets, as at 45, the front bracket being shown extending from the face of hinge lock assembly body 44, are front and rear hinge arms 54 and 56, which in turn, are rigidly affixed to a portion of seat frame 70, shown in phantom in FIG. 3. Front and rear hinge arms 54, 56 (and thus the entire seat assembly 10) are pivotable about pivot line $P_L$ when the foot 78 is disengaged from body floor striker assembly 80. A damper 60 may be employed which is preferably mounted to the face of hinge lock assembly body 44 and coupled to at least one of the hinge arms 54, 56. The damper 60 may be of an oil-filled variety or may be a coiled spring assembly or the equivalent. In a preferred embodiment, damper 60 either assists or provides no resistance to the upward movement of the seat 10 into its stored position. However, when the seat 10 is lowered into its operating position, damper 60 preferably provides adequate resistance in the downward pivoting direction to prevent the jump seat from rotating too quickly as it is being lowered.

The present invention is illustrated with the preferred lock and hook assemblies 46 and 42 and two strikers 14 and 16. However, as should be appreciated by those skilled in the art, any number of locks and strikers may be used, provided that the lock and striker are designed with adequate strength. Additionally, two locks may be used instead of the preferred lock and hook assembly. The lock and hook configuration, as depicted, is preferred for ease of use by a vehicle user.

Hinge lock release lever 49 is pivotably coupled to the face of hinge lock assembly body 44 and mechanically coupled to rear lock 46. Lock release lever knob 48 is provided at the end of release lever 49 to aid in its manual actuation. Upon actuation of hinge lock release lever 49 to position "B", (rotating it forward, to the right in this configuration), rear lock 46 is withdrawn, thus enabling disengagement of previously engaged assemblies 12 and 40. Details of the operation of the rear lock 46 from a striker, such as at 16, is clearly understood by those in the art and will not be described in detail here. Also pivotably coupled to hinge lock release lever 49 is interlock bracket 50, which pivots from its resting position, shown in FIG. 4, to its operational position, shown in FIG. 3, when hinge lock lever is in its "released" position, i.e., rotated forward. When in this position, interlock bracket 50 confronts rear hinge arm 56 at about point "P" and obstructs it, thus preventing it and everything else coupled to it, namely the entire seat assembly 10, from rotating about axis $P_L$ when removed from its operational position. Thus, when seat 10 is disengaged from the floor body 81 and wall 31 of the vehicle, the hinge lock assembly 40 is maintained in substantially the same orientation as when engaged with seat striker assembly 12, being prevented from rotating in relation to the seat base 72. As such, the hinge lock assembly 40 remains in a "released and ready" position until such time as seat 10 is reinstalled in the vehicle. A lift handle 52 may be coupled to hinge lock assembly body 44 to assist the user to manipulate seat 10 during its installation and removal. A lift handle 96 may be provided at the upper surface of seat base 72 towards the center of the vehicle to assist the user in manipulating seat 10 during its installation, storage and removal. Lift handle 96 is preferably constructed in the form of a loop from a flexible material, such as webbed fabric or a resilient plastic, although other materials and configurations may be equally well suited for the intended purpose.

Referring now to FIGS. 1–4, the installation of the seat 10, according to one embodiment of the invention will be described. With both the hinge lock assembly 40 and the foot 78 in their vertical, operational positions, the seat 10 is guided into the vehicle in the area it is to be installed. Preferably, hinge lock assembly 40 is first engaged with seat striker assembly 12 by guiding the hook mouth 43 of front hook 42 within structural channel 18 to engage front seat striker 14. Once front seat striker 14 is engaged, the rear of the seat 10 is lowered until the rear seat striker 16 is aligned with rear hinge lock mouth 47, and then the rear of hinge lock assembly 40 is pressed downward until rear lock 46 engages the rear seat striker. Upon engagement of both front and rear seat strikers 14 and 16, hinge lock release lever 49 is rotated to its "locked" position "A" (rotated rearwardly, to the left in this configuration), thus securing the pivotable hinge lock assembly 40 to the seat striker assembly 12. Actuation of hinge lock release lever 49 to its locked position releases the interlock bracket 50 from confronting rear hinge arm 56, now enabling seat 10 to pivot along axis $P_L$. Once the hinge lock assembly 40 is secured, seat 10 is maneuvered such that the front and rear locks (similar to that at 46 but not shown in detail) of foot 78 are aligned over front and rear body floor strikers 82 and 84. After being aligned, the edge of seat base 72 in the area over the foot 78 may be pressed downward to engage the floor strikers 82 and 84 within the front and rear locks of the foot. This completes the installation procedure of seat 10.

Referring now to FIGS. 1A, 1B and 5, the operation of moving seat 10 into a stored position as shown in FIG. 5, will be described. Beginning with the seat 10 in its operational position, as shown in FIG. 1A, seat back 74 is placed in a substantially fully reclined condition by actuation of seat back release pull 94. Once in a substantially fully reclined position, the user releases seat back release pull 94 whereby the seat back release mechanism 95 re-engages and maintains seat back 74 in the substantially fully reclined condition. Once the seat back 74 is in position for storage, foot 78 is released from the body floor striker assembly 80 by actuation of foot release pull 86. Upon actuation of foot release pull 86, both front and rear foot locks (not shown in detail) disengage from front and rear body floor strikers 82 and 84. Once foot 78 is fully disengaged from the body floor striker assembly 80, the now reclined seat 10 may be rotated about axis $P_L$ towards its storage position. In a preferred embodiment, axis $P_L$ is substantially parallel to both the vehicle floor 81 and the vehicle wall 31. Upon rotation of seat 10 to a position substantially face to face with vehicle wall 31, jump seat latch 92 may be used to engage a wall mounted anchor means, such as grab rail 100. Once the seat 10 is in its stored and locked conditions, as shown in FIG. 5, the cargo area in the vehicle has now been expanded and available for non-passenger use. Note that in this embodiment, the entire floor area is available for utilization, including cargo storage.

Seat 10 has been described and depicted as a single seating unit on the driver's side of a vehicle. However, it is anticipated that embodiments of the invention may be employed in more than one location within a vehicle, such as in a side by side orientation to form a second row of seating behind the vehicle's front seats. It is also anticipated that the described embodiments of the invention may be adapted for use in other structures other than vehicles, such as building structures where there may be a need for removable and storable seating.

It will be apparent to those skilled in the art that various modifications and variations can be made in the removable jump seat for a vehicle according to the invention disclosed herein, as well as in its construction, without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims:

We claim:

1. A seat for selective engagement with the floor of a vehicle and releasable storage against an inside wall of a vehicle, the seat comprising:

a seat base;

a foot coupled to the bottom of the seat base for supporting a portion of the seat base upon the floor and having an engaging means for detachably engaging the floor;

a seat striker assembly mounted to an inside wall of the vehicle on the side of the seat spaced from the foot and having at least one seat striker member;

a hinge lock assembly for hingedly supporting said seat base against the wall and provided with at least one hinge lock for detachably engaging the at least one seat striker member to secure said hinge lock assembly to said vehicle wall when engaged and being actuable for disengaging the at least one hinge lock from the at least one seat striker when actuated; and an actuable floor lock release means for disengaging the foot from the vehicle floor when the release means is actuated, wherein the seat may be pivoted toward and stored substantially against the vehicle wall upon actuation of the floor lock release means; and wherein the seat is detachably disengaged from the vehicle floor and the vehicle wall upon actuation of both said floor lock release means and said hinge lock release means.

2. A seat for selective engagement with the floor of a vehicle and releasable storage against an inside wall of a vehicle, the seat comprising:

a seat base;

a foot coupled to the bottom of the seat base for supporting a portion of the seat base upon the floor and having an engaging means for detachably engaging the floor;

a seat striker assembly mounted to an inside wall of the vehicle on the side of the seat spaced from the foot and having at least one seat striker member;

a hinge lock assembly for hingedly supporting said seat base against the wall and provided with at least one hinge lock for detachably engaging the at least one seat striker member to secure said hinge lock assembly to said vehicle wall when engaged, wherein said hinge lock assembly further comprises a dampening means for retarding the rate of downward movement of said seat upon release from its stored position; and an actuable floor lock release means for disengaging the foot from the vehicle floor when the release means is actuated, wherein the seat may be pivoted toward and stored substantially against the vehicle wall upon actuation of the floor lock release means.

3. A seat for selective engagement with the floor of a vehicle and releasable storage against an inside wall of a vehicle, the seat comprising:

a seat base;

a foot coupled to the bottom of the seat base for supporting a portion of the seat base upon the floor and having an engaging means for detachably engaging the floor;

a seat striker assembly mounted to an inside wall of the vehicle on the side of the seat spaced from the foot and having at least one seat striker member;

a hinge lock assembly for hingedly supporting said seat base against the wall and provided with at least one hinge lock for detachably engaging the at least one seat striker member to secure said hinge lock assembly to said vehicle wall when engaged; and an actuable floor lock release means for disengaging the foot from the vehicle floor when the release means is actuated, wherein the seat striker assembly further comprises a stabilizer bracket and the hinge lock assembly further comprises a stabilizer bumper having a mating surface and being configured to nestingly engage the stabilizer bracket when said hinge lock assembly captively engages the seat striker assembly; and wherein the seat may be pivoted toward and stored substantially against the vehicle wall upon actuation of the floor lock release means.

4. The seat of claim 3 wherein the mating surface the stabilizer bumper is comprised of a resilient material effective to reduce lateral movement of the seat when the stabilizer bumper is nested within the stabilizer bracket.

5. A seat for selective engagement with the floor of a vehicle and releasable storage against an inside wall of a vehicle, the seat comprising:

a seat base;

a foot coupled to the bottom of the seat base for supporting a portion of the seat base upon the floor and having an engaging means for detachably engaging the floor;

a seat striker assembly mounted to an inside wall of the vehicle on the side of the seat spaced from the foot and having at least one seat striker member;

a hinge lock assembly for hingedly supporting said seat base against the wall and provided with at least one hinge lock for detachably engaging the at least one seat striker member to secure said hinge lock assembly to said vehicle wall when engaged, the hinge lock assembly further comprising an interlock means coupled to and actuated by the hinge lock release means for preventing rotation of said hinge lock assembly when the seat is disengaged from the vehicle; and an actuable floor lock release means for disengaging the foot from the vehicle floor when the release means is actuated, wherein the seat may be pivoted toward and stored substantially against the vehicle wall upon actuation of the floor lock release means.

6. A manually removable seat for selective engagement with the floor of a vehicle and releasable storage against an inside wall of a vehicle, the seat comprising:

a seat base having an internal frame;

a seat back pivotably coupled to said seat base;

a seat back locking mechanism to selectively hold the seat back in a locked position relative to the seat base and a release mechanism for unlocking said seat back for staged repositioning toward a fully reclined position, a floor striker assembly within a floor body and having at least one striker;

a foot hingedly coupled to the seat frame for supporting a portion of the seat base upon the floor and being provided with at least one lock for detachably engaging the at least one striker member for securing the foot to the floor body when the seat is installed, the foot being foldable within the seat base when the seat is in its stored position;

a seat striker assembly mounted to an inside wall of the vehicle on the side of the seat spaced from the foot and having at least one seat striker member;

a hinge lock assembly having at least one hinged extension coupled to the seat frame and being configured to support one side of said seat base against the wall, the hinge lock assembly comprising at least one hinge lock for detachably engaging the at least one seat striker member to secure one side of the seat base when the hinge lock assembly is engaged; and an actuable floor lock release means for disengaging the at least one lock from the at least one floor striker member when the release means is actuated, wherein the seat may be rotated toward and stored substantially against the vehicle wall upon actuation of the floor lock release means, and wherein the seat is detachably disengaged from the vehicle floor and the vehicle wall upon actuation of both said floor lock release means and said hinge lock release means.

7. A manually removable seat for selective engagement with the floor of a vehicle and releasable storage against an inside wall of a vehicle, the seat comprising:

a seat base having an internal frame;

a floor striker assembly within a floor body and having at least one striker;

a foot hingedly coupled to the seat frame for supporting a portion of the seat base upon the floor and being provided with at least one lock for detachably engaging the at least one striker member for securing the foot to the floor body when the seat is installed, the foot being foldable within the seat base when the seat is in its stored position;

a seat striker assembly mounted to an inside wall of the vehicle on the side of the seat spaced from the foot and having at least one seat striker member;

a hinge lock assembly having at least one hinged extension coupled to the seat frame and being configured to support one side of said seat base against the wall, the hinge lock assembly comprising at least one hinge lock for detachably engaging the at least one seat striker member to secure one side of the seat base when the hinge lock assembly is engaged, said hinge lock assembly further comprising a dampening means for retarding the rate of downward movement of said seat upon release from its stored position; and an actuable floor lock release means for disengaging the at least one lock from the at least one floor striker member when the release means is actuated, wherein the seat may be rotated toward and stored substantially against the vehicle wall upon actuation of the floor lock release means.

8. A manually removable seat for selective engagement with the floor of a vehicle and releasable storage against an inside wall of a vehicle, the seat comprising:

a seat base having an internal frame;

a floor striker assembly within a floor body and having at least one striker;

a foot hingedly coupled to the seat frame for supporting a portion of the seat base upon the floor and being provided with at least one lock for detachably engaging the at least one striker member for securing the foot to the floor body when the seat is installed, the foot being foldable within the seat base when the seat is in its stored position;

a seat striker assembly mounted to an inside wall of the vehicle on the side of the seat spaced from the foot and having at least one seat striker member;

a hinge lock assembly having at least one hinged extension coupled to the seat frame and being configured to support one side of said seat base against the wall, the hinge lock assembly comprising at least one hinge lock for detachably engaging the at least one seat striker member to secure one side of the seat base when the hinge lock assembly is engaged; and an actuable floor lock release means for disengaging the at least one lock from the at least one floor striker member when the release means is actuated, wherein the seat striker assembly further comprises a stabilizer bracket and the hinge lock assembly further comprises a stabilizer bumper having a mating surface and being configured to nestingly engage the stabilizer bracket when said hinge lock assembly captively engages said seat striker assembly, and wherein the seat may be rotated toward and stored substantially against the vehicle wall upon actuation of the floor lock release means.

9. The seat of claim 8 wherein the mating surface of the stabilizer bumper is comprised of a resilient material effective to reduce lateral movement of the seat when the stabilizer bumper is nested within the stabilizer bracket.

* * * * *